UNITED STATES PATENT OFFICE.

WILLIAM H. FISH, OF PASCOAG, RHODE ISLAND.

IMPROVEMENT IN DYES.

Specification forming part of Letters Patent No. 175,829, dated April 11, 1876; application filed January 31, 1876.

*To all whom it may concern:*

Be it known that I, WILLIAM H. FISH, of Pascoag, in the county of Providence and State of Rhode Island, have invented an Improved Indigo Dye and process of preparing the same for use; and I hereby declare that the following is a full, clear, and exact description thereof.

To prepare the ordinary indigo of commerce for dyeing purposes it has been customary to ferment it by means of molasses, or other similar substance; but this process is objectionable on account of the length of time required to produce fermentation. Furthermore, none of the indigo compounds for dyeing wool are capable of permanently and properly dyeing cotton.

My present invention consists in the employment of "zinc-dust," a new article of commerce, in combination with certain other ingredients, to be hereafter named, in the production of an indigo dye which can be used as successfully in coloring cotton as in coloring wool, silk, and other fabrics.

To enable others skilled in the art to understand and use my invention, I will proceed to describe the manner in which I have carried it out.

My indigo-dye solution consists of the following ingredients, mixed in about the proportions given: One (1) pound of ground indigo; six (6) ounces of zinc-dust, a new article of commerce; six (6) ounces of bisulphite of soda; one (1) pound of caustic soda, the latter previously dissolved in about three (3) quarts of water. These ingredients are placed in a receptacle, and thoroughly incorporated by stirring. The mixture is then brought to a temperature of about 140° Fahrenheit, and after being subjected to this heat for about half an hour, the indigo-dye solution thus prepared is put up in barrels for sale.

Where a bath is to be prepared for dyeing a fabric, a certain quantity of this indigo-dye solution is placed in a vat containing the required proportion of water, and a small quantity of a solution of muriate of tin is added thereto, the whole being thoroughly stirred together. This dye-mixture is then heated to about 140° Fahrenheit, when it is ready for the dipping of wool, cotton, or other fabric to be colored, the heat causing the dye to more thoroughly penetrate cotton than were the dye in a cold state.

The proportions of the indigo-dye solution and water depend on the degree of shade or color desired.

Where a medium shade of blue is required about one-quarter ($\frac{1}{4}$) of a pint of indigo-dye solution is mixed with about four (4) quarts of water.

When a lighter or darker shade of blue is required, the quantity of indigo-dye solution is lessened or increased, according to the judgment and experience of the dyer.

The quantity of the solution of muriate of tin employed is determined by the amount of indigo-dye solution, being in the proportion of from six (6) to eight (8) ounces of the former to one (1) gallon of the latter.

The office of the solution of the muriate of tin is to readily open the indigo and create fermentation, which neutralizes the alkali, and prevents the precipitation of the indigo, and the solution of the muriate of tin has a less tendency to sour the dye than sulphuric acid, and the employment of alkalies to remove any slight sourness which may be produced is rendered almost or entirely unnecessary.

By the substitution of zinc-dust for the tin crystals heretofore used the following advantages are gained: The dye is capable of giving a permanent color to cotton, as well as to wool, silk, and other fabrics, and, owing to a smaller quantity of zinc-dust being required than that of the tin crystals, and being cheaper than the latter, the indigo-dye solution is prepared at a less cost than heretofore where tin crystals formed one of its ingredients.

What I claim as my invention, and desire to secure by Letters Patent, is—

The indigo-dye solution composed of indigo, zinc-dust, bisulphite of soda, caustic soda, and water, in, or about in, the proportions herein set forth.

Witness my hand this 26th day of January, A. D. 1876.

WILLIAM H. FISH.

In presence of—
EDWARD M. SALISBURY,
FRANK. H. CLOUGH.